ered Dec. 28, 1954

2,698,345

5-BENZYLOXY-2-NITRO-ALPHA-[1-(1-NITROALKYL)]BENZYL ALCOHOLS

Merrill E. Speeter, Kalamazoo, Mich., assignor to The Upjohn Company, Kalamazoo, Mich., a corporation of Michigan No Drawing. Application February 23, 1952, Serial No. 273,147

11 Claims. (Cl. 260—613)

The present invention relates to a novel process for the preparation of organic compounds, and is more particularly concerned with a novel process for the preparation of 5-benzyloxy-2-nitro-α-[1-(1-nitroalkyl)]benzyl alcohols and with the products thus-produced.

The compounds of the present invention may be represented by the formula:

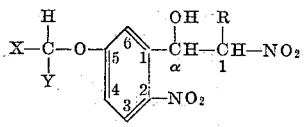

wherein X represents phenyl, halophenyl, lower alkoxyphenyl, or lower alkylphenyl, Y represents hydrogen, phenyl, halophenyl, lower alkoxyphenyl, or lower alkylphenyl, and R represents hydrogen or lower-alkyl.

It is an object of the present invention to prepare novel compounds, 5-benzyloxy-2-nitro-α-[1-(1-nitroalkyl)]benzyl alcohols. It is a further object of the present invention to provide a novel process for the preparation of 5-benzyloxy-2-nitro-α-[1-(1-nitroalkyl)]benzyl alcohols. Other objects of the invention will be apparent to one skilled in the art to which the invention pertains.

The novel compounds of the present invention are important intermediates in the preparation of 5-hydroxytryptamine, or more briefly named, serotonin, a substance known to possess powerful vasoconstrictor qualities.

Serotonin, as more fully disclosed in my co-pending application, Serial Number 265,045, filed January 4, 1952, is produced by the debenzylation of a 5-benzyloxytryptamine. 5-benzyloxytryptamines, as more fully disclosed in my co-pending application, Serial Number 260,315, filed December 6, 1951, are prepared by the reduction of 5-benzyloxy-3-indoleacetonitriles, and the latter are prepared by the reaction of a haloacetonitrile with a 5-benzyloxyindole in a Grignard reaction, as more fully disclosed in my co-pending application, Serial Number 257,961, filed November 23, 1951. The 5-benzyloxyindoles, as more fully disclosed in my co-pending application, Serial Number 273,149, filed concurrently herewith, are prepared by the reaction of a 5-benzyloxy-β,2-dinitrostyrene with powdered iron and an aliphatic acid, the intermediate 5-benzyloxy-β,2-dinitrostyrenes being prepared by the dehydration of the novel 5-benzyloxy-2-nitro-α-[1-(1-nitroalkyl)]benzyl alcohols of the present invention, as more fully disclosed in my co-pending application, Serial Number 273,148, also filed concurrently herewith.

According to the method of the present invention, the 5-benzyloxy-2-nitro-α-[1-(1-nitroalkyl)]benzyl alcohols are prepared by the condensation of 5-benzyloxy-2-nitrobenzaldehydes, prepared according to the method of Burton [J. Chem. Soc. 1935, 1265] or Portmann and Giovannini [Helv. Chim. Acta, 31, 1381 (1948)], with a 1-nitroalkane in the presence of an alkali-metal hydroxide to produce a 5-benzyloxy-2-nitro-α-[1-(1-nitroalkyl)]benzyl alcohol alkali-metal salt and thereafter acidifying the thus-produced salt to yield the desired 5-benzyloxy-2-nitro-α-[1-(1-nitroalkyl)]benzyl alcohol.

The condensation product, hereinafter referred to as the nitro alcohol salt, is represented by the formula:

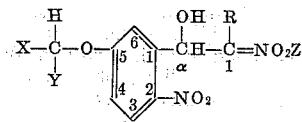

wherein X, Y, and R have the same values as given above, and Z represents an alkali-metal. In carrying out the process of the invention, these compounds are prepared by condensation of a selected 5-benzyloxy-2-nitrobenzaldehyde, dissolved in a suitable organic solvent, a lower alkanol, e. g., methanol, ethanol, propanol, isopropanol, and the like being preferred, with a 1-nitroalkane. Representative 1-nitroalkanes which are suitable for the reaction include the following: nitromethane, nitroethane, 1-nitropropane, 1-nitrobutane, 1-nitropentane, 1-nitrohexane, 1-nitroheptane, 1-nitrooctane, 1-nitrononane, and the like. Representative alkali-metal hydroxides are potassium hydroxide, sodium hydroxide, lithium hydroxide, rubidium hydroxide, and cesium hydroxide. The reaction is usually conducted at a temperature between about zero and minus forty degrees centigrade, with about minus fifteen degrees centigrade being preferred. After admixing the reactants and stirring for a suitable period, usually between about one to three hours, the reaction mixture containing the alkali-metal salt of the 5-benzyloxy-2-nitro-α-[1-(1-nitroalkyl)]benzyl alcohol is acidified to produce the free 5-benzyloxy-2-nitro-α-[1-(1-nitroalkyl)]benzyl alcohol. Suitable acidifying agents are the organic acids e. g., acetic, formic, propionic, butyric, or the like, carbon dioxide, or an inorganic acid such as sulfuric, hydrochloric, hydrobromic, or the like. When organic acids or carbon dioxide are employed for acidification, the alcohol may be recovered by adding the reaction mixture, usually after stirring, to a large quantity of water, stirring, filtering to remove the precipitated alcohol, and recrystallizing from alcohol-water. When an inorganic acid is employed in the acidification step, the product is usually a mixture of the 5-benzyloxy-2-nitro-α-[1-(1-nitroalkyl)]benzyl alcohol and the corresponding 5-benzyloxy-β,2-dinitrostyrene. The acidification in such case is usually conducted by adding the inorganic acid to the nitro alcohol salt, adding water, extracting the liberated oil with a solvent such as ether, benzene, chloroform, toluene, ethylene dichloride, or the like, with ether being preferred, drying and concentrating the solution, and separating the 5-benzyloxy-2-nitro-α-[1-(1-nitroalkyl)]benzyl alcohol therefrom. Numerous suitable isolation procedures may be employed and are known in the art. One method of separation of the alcohol from the styrene, for example, involves adding the reaction product, after drying and concentrating, to about three volumes of a boiling solvent such as a lower alkanol, e. g., ethanol, boiling the mixture, e. g., for about five minutes, and filtering to remove the relatively insoluble 5-benzyloxy-β,2-dinitrostyrene. Additional 5-benzyloxy-β,2-dinitrostyrene may be removed by cooling the filtrate in an ice bath, and again filtering to remove the precipitated 5-benzyloxy-β,2-dinitrostyrene. The filtrate, containing the 5-benzyloxy-2-nitro-α-[1-(1-nitroalkyl)]benzyl alcohol, may then be added to a large quantity of water and the resulting mixture extracted with a solvent such as ether, chloroform, or benzene, with ether being preferred. After concentrating the solvent extracts, as in a vacuum, the 5-benzyloxy-2-nitro-α-[1-(1-nitroalkyl)]benzyl alcohols may be crystallized from solution by the addition of a solvent such as methylcyclohexane, toluene, ethyl acetate, or alcohol-water and recovered by filtration.

The following examples will serve to illustrate the process and products of this invention, but the said invention is not to be considered as limited thereto.

*Example 1.—5-benzyloxy-2-nitro-α-nitromethylbenzyl alcohol*

A solution of 64.3 grams (0.25 mole) of 5-benzyloxy-2-nitro-benzaldehyde, in 1300 milliliters of ethanol and 75 milliliters of water, was chilled to minus fifteen degrees centigrade in a Dry Ice-alcohol bath. To the chilled solution was added 24 grams (0.394 mole) of nitromethane, followed immediately by a slow stream of a solution of 33 grams of 85 per cent potassium hydroxide in 500 milliliters of ethanol and fifty milliliters of water. Within thirty to 45 minutes the potassium salt of the nitro alcohol separated as a finely divided solid. The reaction mixture was stirred for an additional hour while sixty grams of acetic acid was added in a slow stream, the cooling bath was removed, and three liters of cold water was added. An additional thirty grams of acetic acid was added and the solution stirred for an additional hour until the product had solidified and was dispersed as small granules, whereupon the nitro alcohol was filtered, washed thoroughly with cold water and dried. The yellow 5-benzyloxy-2-nitro-α-nitromethylbenzyl alcohol weighed 79.5 grams and melted at 93–96 degrees centigrade. A sample recrystallized from alcohol-water melted at 97–98 degrees centigrade.

*Analysis.*—Per cent calculated for $C_{15}H_{14}N_2O_6$: C, 56.59; H, 4.43; N, 8.80. Found: C, 56.98; H, 4.52; N, 8.64.

*Example 2.—5-benzyloxy-2-nitro-α-nitromethylbenzyl alcohol*

A solution of twenty grams (0.077 mole) of 5-benzyloxy-2-nitrobenzaldehyde and 7.5 grams (0.12 mole) of nitromethane in 600 milliliters of 95 per cent ethanol was cooled in an ethanol-Dry Ice bath to minus fifteen degrees centigrade, whereafter 11.5 grams of potassium hydroxide in 200 milliliters of ethanol was added to the cooled solution with constant stirring, which was continued for an additional hour at a temperature between minus ten and minus fifteen degrees centigrade. The cold mixture was acidified with dilute hydrochloric acid, whereupon all solids dissolved. The resulting mixture was poured into two liters of water, resulting in formation of an oil which was extracted with four 200-milliliter portions of ether. The combined extracts were dried, concentrated, and added to sixty milliliters of boiling ethanol. The resulting solution was heated for an additional three minutes and the relatively insoluble 5-benzyloxy-β,2-dinitrostyrene thereupon recovered by filtration. After cooling to room temperature, the filtrate was additionally cooled in an ice bath for three hours, whereupon an additional quantity of 5-benzyloxy-β,2-dinitrostyrene crystallized and was removed by filtration. The remaining 5-benzyloxy-2-nitro-α-nitromethylbenzyl alcohol solution was added to two liters of water and the mixture extracted with three-200 milliliter portions of ether. The combined extracts were dried and concentrated under a vacuum of fifty millimeters. The 5-benzyloxy-2-nitro-α-nitromethylbenzyl alcohol was recrystallized from the concentrated mixture by the addition of 75 milliliters of toluene. Upon filtering, the recovered 5-benzyloxy-2-nitro-α-nitromethylbenzyl alcohol weighed 8.7 grams and melted at 97–98 degrees centigrade.

*Example 3.—5-benzyloxy-2-nitro-α-[1-(1-nitroethyl)]benzyl alcohol*

In essentially the same manner as given in Examples 1 and 2, 5-benzyloxy-2-nitro-α-[1-(1-nitroethyl)]benzyl alcohol is prepared by causing 1-nitroethane to react with 5-benzyloxy-2-nitrobenzaldehyde.

In the same manner other 5-benzyloxy-2-nitro-α-[1-(1-nitroalkyl)]benzyl alcohols are prepared by reacting 5-benzyloxy-2-nitrobenzaldehyde and the appropriate 1-nitroalkane, e. g., 5-benzyloxy-2-nitro-α-[1-(1-nitropropyl)]benzyl alcohol, 5-benzyloxy-2-nitro-α-[1-(1-nitrobutyl)]benzyl alcohol, 5-benzyloxy-2-nitro-α-[1-(1-nitroamyl)]benzyl alcohol, 5-benzyloxy-2-nitro-α-[1-(1-nitrohexyl)]benzyl alcohol, 5-benzyloxy-2-nitro-α-[1-(1-nitroheptyl)]benzyl alcohol, 5-benzyloxy-2-nitro-α-[1-(1-nitrooctyl)]benzyl alcohol, 5-benzyloxy-2-nitro-α-[1-(1-nitrononyl)]benzyl alcohol, and the like.

*Example 4.—5-benzhydryloxy-2-nitro-α-nitromethylbenzyl alcohol*

In essentially the same manner as given in Examples 1 and 2, 5-benzhydryloxy-2-nitro-α-nitromethylbenzyl alcohol is prepared by causing 5-benzhydryloxy-2-nitrobenzaldehyde to react with nitromethane.

In the same manner the following 5-benzhydryloxy-2-nitro-α-[1-(1-nitroalkyl)]benzyl alcohols are prepared by reacting the chosen 1-nitroalkane with 5-benzhydryloxy-2-nitrobenzaldehyde: 5-benzhydryloxy-2-nitro-α-[1-(1-nitroethyl)]benzyl alcohol, 5-benzhydryloxy-2-nitro-α-[1-(1-nitropropyl)]benzyl alcohol, 5-benzhydryloxy-2-nitro-α-[1-(1-nitrobutyl)]benzyl alcohol, 5-benzhydryloxy-2-nitro-α-[1-(1-nitrononyl)]benzyl alcohol, and the like.

*Example 5.—5-(para,para'-dimethylbenzhydryloxy)-2-nitro-α-nitromethylbenzyl alcohol*

In essentially the same manner as given in Examples 1 and 2, 5-(para,para'-dimethylbenzhydryloxy)-2-nitro-α-nitromethylbenzyl alcohol is prepared by causing 5-(para,para'-dimethylbenzhydryloxy)-2-nitrobenzaldehyde to react with nitromethane.

In the same manner the following 5-alkylbenzyloxy-2-nitro-α-[1-(1-nitroalkyl)]benzyl alcohols are prepared by reacting the selected 1-nitroalkane and the selected 5-alkylbenzyloxy-2-nitrobenzaldehyde: 5-(meta,meta'-diethylbenzhydryloxy)-2-nitro-α-[1-(1-nitropropyl)]benzyl alcohol, 5-(para-propylbenzyloxy)-2-nitro-α-nitromethylbenzyl alcohol, 5-(para-methylbenzyloxy)-2-nitro-α-[1-(1-nitroethyl)]benzyl alcohol, and the like.

*Example 6.—5-(para,para'-dimethoxybenzhydryloxy)-2-nitro-α-nitromethylbenzyl alcohol*

In essentially the same manner as given in Examples 1 and 2, 5-(para,para'-dimethoxybenzhydryloxy)-2-nitro-α-nitromethylbenzyl alcohol is prepared by causing 5-(para,para'-dimethoxybenzhydryloxy)-2-nitrobenzaldehyde to react with nitromethane.

In the same manner the following 5-alkoxybenzyloxy-2-nitro-α-[1-(1-nitroalkyl)]benzyl alcohols are prepared by reacting the selected 1-nitroalkane and the appropriate 5-alkoxybenzyloxy-2-nitrobenzaldehyde: 5-(para,para'-dipropoxybenzhydryloxy)-2-nitro-α-[1-(1-nitrobutyl)]benzyl alcohol, 5-(para-ethoxybenzyloxy)-2-nitro-α-nitromethylbenzyl alcohol, 5-(para-ethoxybenzyloxy)-2-nitro-α-[1-(1-nitroethyl)]benzyl alcohol, and the like.

*Example 7.—5-(para,para'-dichlorobenzhydryloxy)-2-nitro-α-nitromethylbenzyl alcohol*

In essentially the same manner as given in Examples 1 and 2, 5-(para,para'-dichlorobenzhydryloxy)-2-nitro-α-nitromethylbenzyl alcohol is prepared by causing 5-(para,para'-dichlorobenzhydryloxy)-2-nitrobenzaldehyde to react with nitromethane.

In the same manner the following 5-halobenzyloxy-2-nitro-α-[1-(1-nitroalkyl)]benzyl alcohols are prepared by reacting the selected 1-nitroalkane and the appropriate 5-halobenzyloxy-2-nitrobenzaldehyde: 5-(para,para'-dibromobenzhydryloxy)-2-nitro-α-[1-(1-nitrohexyl)]benzyl alcohol, 5-(para-chlorobenzyloxy)-2-nitro-α-nitromethylbenzyl alcohol, 5-(para-iodobenzyloxy)-2-nitro-α-[1-(1-nitrobutyl)]benzyl alcohol, and the like.

It is to be understood that this invention is not to be limited to the exact details of operation or exact compounds shown and described, as obvious modifications and equivalents will be apparent to one skilled in the art and the invention is therefore to be limited only by the scope of the appended claims.

I claim:

1. In a process for the preparation of a 5-benzyloxy-2-nitro-α-[1-(1-nitroalkyl)]benzyl alcohol, the steps of condensing a 5-benzyloxy-2-nitrobenzaldehyde with a 1-nitroalkane in the presence of an alkali-metal hydroxide, and acidifying the salt thus-produced to yield a 5-benzyloxy-2-nitro-α-[1-(1-nitroalkyl)]benzyl alcohol.

2. In a process for the preparation of a 5-benzyloxy-2-nitro-α-[1-(1-nitroalkyl)]benzyl alcohol, the steps of condensing a 5-benzyl-2-nitrobenzaldehyde of the formula:

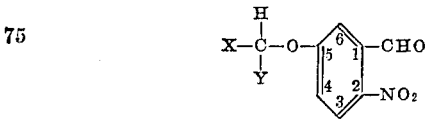

wherein X is selected from the group consisting of phenyl, halophenyl, lower alkoxyphenyl, and lower alkylphenyl, and wherein Y is selected from the group consisting of hydrogen, phenyl, halophenyl, lower alkoxyphenyl, and lower alkylphenyl, with a 1-nitroalkane in the presence of an alkali-metal hydroxide, and acidifying the salt thus-produced to yield a 5-benzyloxy-2-nitro-α-[1-(1-nitroalkyl)]benzyl alcohol.

3. In a process for the preparation of a 5-benzyloxy-2-nitro-α-[1-(1-nitroalkyl)]benzyl alcohol, the steps of condensing a 5-benzyloxy-2-nitrobenzaldehyde of the formula:

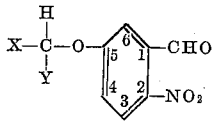

wherein X is selected from the group consisting of phenyl, halophenyl, lower alkoxyphenyl, and lower alkylphenyl, and wherein Y is selected from the group consisting of hydrogen, phenyl, halophenyl, lower alkylphenyl, and lower alkoxyphenyl, with a 1-nitroalkane in the presence of an alkali-metal hydroxide, and acidifying the salt thus-produced with an organic acid to yield a 5-benzyloxy-2-nitro-α-[1-(1-nitroalkyl)]benzyl alcohol.

4. In a process for the preparation of a 5-benzyloxy-2-nitro-α-[1-(1-nitroalkyl)]benzyl alcohol, the steps of condensing a 5-benzyloxy-2-nitrobenzaldehyde of the formula:

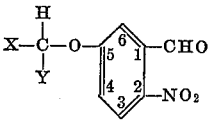

wherein X is selected from the group consisting of phenyl, halophenyl, lower alkylphenyl, and lower alkoxyphenyl, and wherein Y is selected from the group consisting of hydrogen, phenyl, halophenyl, lower alkylphenyl, and lower alkoxyphenyl, with a 1-nitroalkane in the presence of an alkali-metal hydroxide, acidifying the salt thus-produced with an inorganic acid, and separating the components of the reaction product thus-produced including a 5 - benzyloxy - 2 - nitro - α - [1 - (1 - nitroalkyl)]benzyl alcohol.

5. In a process for the preparation of 5-benzyloxy-2-nitro-α-nitromethylbenzyl alcohol, the steps of condensing 5-benzyloxy-2-nitrobenzaldehyde with nitromethane in the presence of an alkali-metal hydroxide, and acidifying the salt thus-produced to yield 5-benzyloxy-2-nitro-α-nitromethylbenzyl alcohol.

6. In a process for the preparation of 5-benzhydryloxy-2-nitro-α-nitromethylbenzyl alcohol, the steps of condensing 5-benzhydryloxy-2-nitrobenzaldehyde with nitromethane in the presence of an alkali-metal hydroxide, and acidifying the salt thus-produced to yield 5-benzhydryloxy-2-nitro-α-nitromethylbenzyl alcohol.

7. A 5 - benzyloxy - 2 - nitro - α - [1 - (1 - nitroalkyl)]benzyl alcohol of the formula:

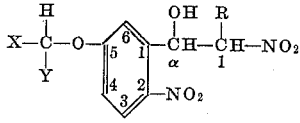

wherein X is selected from the group consisting of phenyl, halophenyl, lower alkoxyphenyl, and lower alkylphenyl, Y is selected from the group consisting of hydrogen, phenyl, halophenyl, lower alkoxyphenyl, and lower alkylphenyl, and wherein R is selected from the group consisting of hydrogen and lower-alkyl.

8. A 5 - benzyloxy - 2 - nitro - α - [1 - (1 - nitroalkyl)]benzyl alcohol, wherein the alkyl group contains from one to nine carbon atoms, inclusive.

9. 5 - benzyloxy - 2 - nitro - α - nitromethylbenzyl alcohol.

10. A 5 - benzhydryloxy - 2 - nitro - α - [1 - (1 - nitroalkyl)]benzyl alcohol, wherein the alkyl group contains from one to nine carbon atoms, inclusive.

11. 5 - benzhydryloxy - 2 - nitro - α - nitromethylbenzyl alcohol.

References Cited in the file of this patent

UNITED STATES PATENTS

| Number | Name | Date |
|---|---|---|
| 2,601,282 | Heinzelmann | June 24, 1952 |

OTHER REFERENCES

Hass et al., Chem. Reviews, vol. 22, June 1943, pp. 406–410.